(12) United States Patent
Liao

(10) Patent No.: US 10,219,641 B2
(45) Date of Patent: Mar. 5, 2019

(54) BOTTLE HAVING WATER VOLUME MEASURING FUNCTION

(71) Applicant: BALTEK CO., LIMITED, Wanchai (HK)

(72) Inventor: Tzu-Chuan Liao, Wanchai (HK)

(73) Assignee: BALTEK CO., LIMITED, Wanchai (HK)

( * ) Notice: Subject to any disclaimer, the term of this patent is extended or adjusted under 35 U.S.C. 154(b) by 19 days.

(21) Appl. No.: 15/593,327

(22) Filed: May 12, 2017

(65) Prior Publication Data

US 2017/0332813 A1   Nov. 23, 2017

(30) Foreign Application Priority Data

May 19, 2016   (TW) .............................. 105115633 A

(51) Int. Cl.
*A47G 19/22* (2006.01)
*B65D 23/16* (2006.01)
(Continued)

(52) U.S. Cl.
CPC ............ *A47G 19/2227* (2013.01); *A45F 3/18* (2013.01); *B65D 23/16* (2013.01); *B65D 25/56* (2013.01);
(Continued)

(58) Field of Classification Search
CPC ............... A47G 2019/225; A47G 23/16; A47J 41/0094; B65D 23/16; B65D 25/56; B65D 51/248; G01F 23/2966; G01F 25/0061
See application file for complete search history.

(56) References Cited

U.S. PATENT DOCUMENTS

| 4,811,595 | A | * | 3/1989 | Marciniak | ............... G01F 22/02 |
| | | | | | 73/149 |
| 4,991,433 | A | * | 2/1991 | Warnaka | ................. G01F 17/00 |
| | | | | | 367/908 |

(Continued)

FOREIGN PATENT DOCUMENTS

WO          01/84086 A1     11/2001

OTHER PUBLICATIONS

Webster, Emile S., and Clive E. Davies. "The use of Helmholtz resonance for measuring the volume of liquids and solids." Sensors 10.12 (2010): 10663-10672.*

(Continued)

*Primary Examiner* — Daniel S Larkin
(74) *Attorney, Agent, or Firm* — Chun-Ming Shih; HDLS IPR Services

(57) ABSTRACT

A bottle having a water volume measuring function comprises a bottle-lid, a bottle-body, and a measure module disposed in the bottle-lid which comprises at least a micro controller unit, a memory unit and a sound wave transceiver unit. The memory unit stores a lookup table with corresponding relationships between a plurality of frequencies and remained water volumes in the bottle-body. The sound wave transceiver unit emits sound waves with sweeping frequencies towards the bottle-body and receives reflected waves. The micro controller unit determines if any frequency of the sound waves is an air-resonance frequency according to the energy level of each of the reflected waves. When a sound wave frequency is determined as an air-resonance frequency, the micro controller unit obtains the corresponding remained water volume by checking with the air-resonance frequency in the lookup table and users can view the remained water volume without opening the bottle-lid.

9 Claims, 7 Drawing Sheets

(51) Int. Cl.
  *B65D 25/56*  (2006.01)
  *A45F 3/18*  (2006.01)
  *B65D 51/24*  (2006.01)
  *B65D 41/02*  (2006.01)
  *G01F 23/296*  (2006.01)
  *G01F 25/00*  (2006.01)
  *A47J 41/00*  (2006.01)
  *A47G 23/16*  (2006.01)

(52) U.S. Cl.
  CPC ........... *B65D 41/02* (2013.01); *B65D 51/248* (2013.01); *G01F 23/2966* (2013.01); *G01F 25/0061* (2013.01); *A47G 23/16* (2013.01); *A47G 2019/225* (2013.01); *A47G 2019/2244* (2013.01); *A47J 41/0094* (2013.01)

(56) References Cited

U.S. PATENT DOCUMENTS

| | | | |
|---|---|---|---|
| 5,251,482 A * | 10/1993 | Bates | G01F 17/00 73/149 |
| 2006/0021448 A1 | 2/2006 | Young et al. | |
| 2006/0093525 A1 * | 5/2006 | Brunner | G01F 23/2965 422/509 |
| 2007/0103333 A1 * | 5/2007 | Michalski | G01F 23/284 340/853.1 |
| 2011/0166699 A1 * | 7/2011 | Palmquist | B67D 1/1234 700/236 |
| 2012/0056628 A1 * | 3/2012 | Michalski | G01F 23/284 324/629 |
| 2012/0268139 A1 * | 10/2012 | Fend | G01F 23/24 324/601 |
| 2014/0130594 A1 * | 5/2014 | Cameron | G01F 23/2966 73/290 V |
| 2015/0122014 A1 * | 5/2015 | Cameron | G01F 23/2966 73/290 V |
| 2015/0355012 A1 * | 12/2015 | Gurumohan | A47G 19/00 73/290 V |
| 2016/0025545 A1 | 1/2016 | Saltzgiver et al. | |
| 2016/0292796 A1 * | 10/2016 | Furlotte | G06Q 50/12 |
| 2016/0313170 A1 * | 10/2016 | Cameron | G01F 23/2966 |
| 2017/0188731 A1 * | 7/2017 | Schuller | A47G 23/16 |
| 2017/0292870 A1 * | 10/2017 | Carter | G01F 23/2962 |
| 2017/0341830 A1 * | 11/2017 | Nishizawa | B65D 51/24 |

OTHER PUBLICATIONS

European Search Report dated Oct. 13, 2017 of the corresponding European patent application No. EP17171606.1.

* cited by examiner

BOTTLE HAVING WATER VOLUME MEASURING FUNCTION

BACKGROUND OF THE INVENTION

Field of the Invention

The present invention relates to a bottle, in particular relates to a bottle having water volume measuring function.

Description of Prior Art

It was widely reported that having regular water intake is good for health. Accordingly, there are more and more people are used to carry water bottle by themselves and drink water anytime.

Some people use transparent bottles made by plastics. The bottles are printed with scale lines so that users can check the remained water volume of the bottle and decide if the water daily intake is enough. However, the plastic bottles are not thermally insulated which are not desirable for some users if they want to drink hot water.

Typically, thermal bottles are made by opaque materials (such as stainless steel), which means users do not know the remained water volume of the bottle without opening the bottle-lid and checking how much water left. In other words, users cannot use the simplest way to know the remained water volume of a bottle. The steps for confirming how much water are consumed from the bottle can be quiet inconvenient.

SUMMARY OF THE INVENTION

The objective of the present invention is to provide a bottle having a water volume measuring function which measures the remained water volume in the bottle-body via emitting sound waves with sweeping frequencies inside the bottle and receiving the reflected sound waves.

In order to achieve the above mentioned objective, a bottle having a water volume measuring function is disclosed according to the present invention which comprises a bottle-lid, a bottle-body, and a measure module disposed in the bottle-lid. The water volume measuring function is implemented with the measure module in the bottle. The measure module comprises at least a micro controller unit, a memory unit and a sound wave transceiver unit. The memory unit is used for storing a lookup table with corresponding relationships of a plurality of frequencies and remained water volumes in the bottle-body. The sound wave transceiver unit is used for emitting sound waves with sweeping frequencies towards the bottle-body and receiving reflected waves. The micro controller unit is used for determining if any frequency of the emitted sound waves is an air-resonance frequency according to the energy level of each of the reflected waves. When a sound wave frequency is determined as an air-resonance frequency, the micro controller unit obtains the corresponding remained water volume by checking with the air-resonance frequency in the lookup table.

The bottle of the present invention measures the remained water volume in the bottle-body via emitting sound waves with sweeping frequencies. Thus users are allowed to be informed of the remained water volume without opening the bottle-lid.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
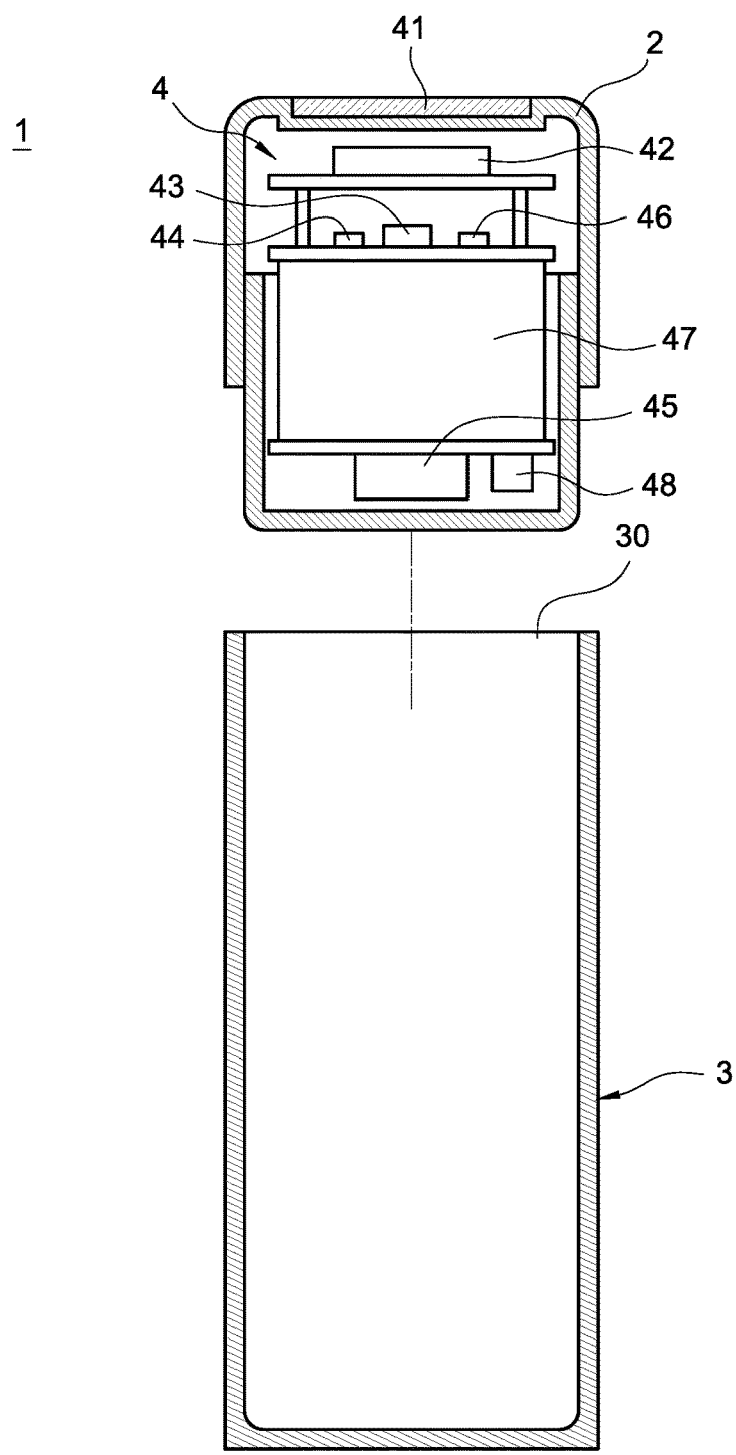
FIG. 1 is a perspective view of a bottle according to the first embodiment of the present invention.

FIG. 1 is a perspective view of a bottle according to the first embodiment of the present invention. As shown in FIG. 1, the bottle having water volume measuring function disclosed in the present invention (referred as bottle 1 in the following) comprises a bottle-lid 2 and a bottle-body 3. The bottle-body 3 has an opening 30 on one side. The bottle-lid 2 is used for covering the opening 30. When the bottle-lid 2 overs the opening 30 in the bottle-body 3, an enclosed space is formed within the bottle-body 3. The enclosed space is used for receiving liquid (such as water or soft drinks) and the liquid received within the bottle-body 3 does not spill out of the bottle-body 3.

The main technical feature of the present invention is that the bottle 1 further comprises a measure module 4 disposed within the bottle-lid 2. When the bottle-lid 2 covers the opening 30, the measure module 4 faces exactly towards the inner side of the enclosed space. As shown in FIG. 1, the measure module 4 comprises a trigger unit 41, a display unit 42, a micro controller unit 43, a memory unit 44 and a sweeping frequency type sound wave transceiver unit 45.

The trigger unit 41 is disposed at one side surface of the bottle-lid 2 to be operated externally by a user to trigger the measure module 4 to measure the remained water volume in the bottle-body 3. The display unit 42 is used for displaying the remained water volume after the measure module 4 completes measuring. In the embodiment, the display unit 42 is Light-Emitting Diode (LED), Liquid-Crystal Display (LCD), seven-segment display etc. but the scope is not limited thereto.

Preferably, the trigger unit 41 is a transparent touch control panel. The display unit 42 is disposed below the trigger unit 41. Thus, a user is allowed to read the displayed information of the display unit 42 directly through the trigger unit 41. Preferably, the trigger unit 41 is integrated with the display unit 42 to form a single touch control panel, but the scope is not limited thereto.

The micro controller unit 43 and the memory unit 44 are disposed inside the measure module 4. The sweeping frequency type sound wave transceiver unit 45 (referred as sound wave transceiver unit 45 in the following) is disposed at the bottom of the measure module 4 and faces externally from the bottom of the measure module 4. More specifically, the sound wave transceiver unit 45 is disposed at the center of the bottle-lid 2. When the bottle-lid 2 covers on the bottle-body 3, the location of the sound wave transceiver unit 45 is exactly at the center of the bottle-body 3.

Figure 2:
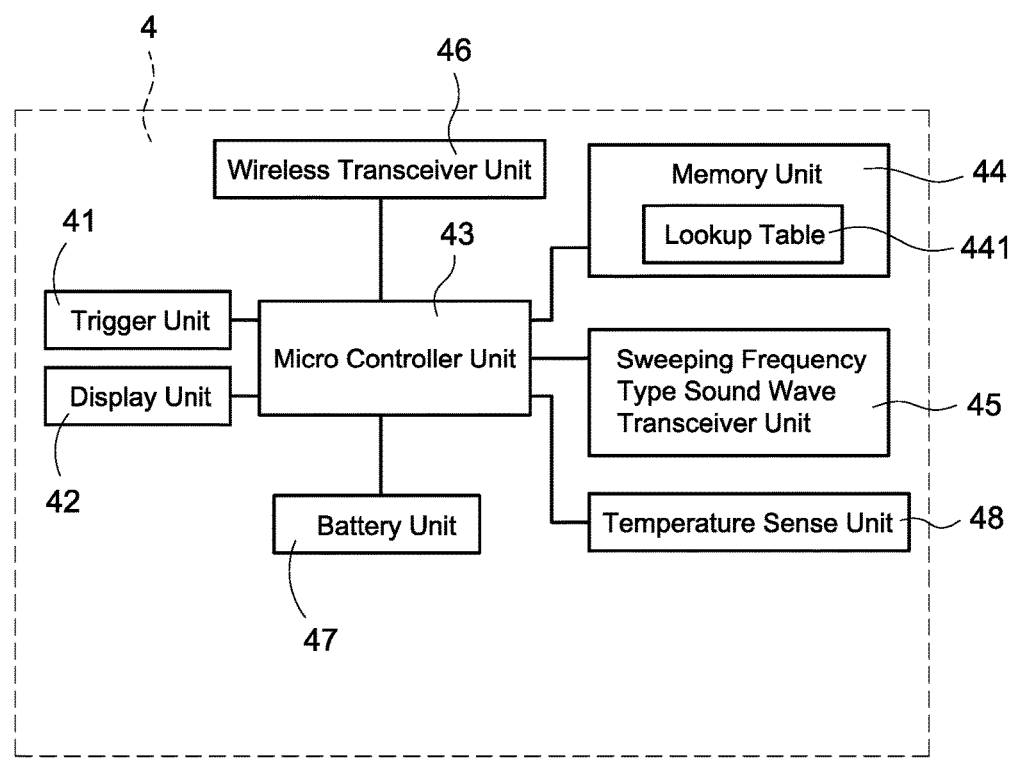
FIG. 2 is a block diagram of a measure module according to the first embodiment of the present invention.

FIG. 2 is a block diagram of a measure module according to the first embodiment of the present invention. As shown in FIG. 2, the micro controller unit 43 electrically connects to the above mentioned trigger unit 41, the display unit 42, the memory unit 44 and the sound wave transceiver unit 45.

A lookup table 441 with corresponding relationships of a plurality of frequencies and remained water volumes in the bottle-body 3 is pre-stored in the memory unit 44. Specifically, the technical means utilized in the present invention is that the sound wave transceiver unit 45 continuously emits sound waves with sweeping frequencies towards the bottle-body 3 and receives reflected waves which are reflected by the water surface within the bottle-body 3. The micro controller unit 43 determines if any frequency of the emitted sound waves is an air-resonance frequency according to the energy level of each of the reflected waves (i.e. if the emitted sound wave generates an air-resonance effect in the enclosed space or not). When the micro controller unit 43 observes the air-resonance frequency, the micro controller unit 43 checks with the air-resonance frequency in the lookup table 441 in order to obtain the corresponding remained water volume and displays the remained water volume on the display unit 42.

Specifically, when the micro controller unit 43 observes the air-resonance frequency, the air-resonance frequency is applied in a mathematical formula to directly calculate the remained water volume (the procedure is detailed in the following). The bottle according to the present invention, the corresponding relationship between the plurality of air-resonance frequencies and the plurality of remained water volumes are pre-calculated and pre-stored in the lookup table 441 and the lookup table checking means is used for replacing real time calculation. Accordingly, the calculating workload of the micro controller unit 43 is reduced which further shortened the required time length of water volume measuring and also the power consumption of the measure module 4 is lowered. The content of an exemplary lookup table 441 is listed below:

| Frequency | Remained water volume |
|---|---|
| F1 | A1 |
| F2 | A2 |
| F3 | A3 |
| ... | ... |
| Fn | An |

It should be note that the temperature (t) of the bottle-body 3 has impact on the velocity (v) of the sound wave (generally v=331.45+0.6t) within the bottle-body 3, which means that given the remained water volume is the same, the sound wave may have different air-resonance frequencies within the bottle-body 3 under different temperatures. In the embodiment, when the temperature of the bottle-body 3 is at the room temperature (21° C.), the velocity of the sound wave is 344 m/s, but the scope is not limited thereto.

More specifically, the shape of the bottle-body 3 also has an impact on the air-resonance frequency of the sound wave within the bottle-body 3. In the embodiment, the bottle-body 3 is a cylinder bottle-body, but the scope is not limited thereto. Bottle-body of the present invention can has different shapes. However, the content of the lookup table 411 are different when the bottle-body has different shapes (because the air-resonance frequencies according to each remained water volume are different).

The trigger unit 41 electrically connects to the micro controller unit 43. In the embodiment, the micro controller unit 43 controls the sound wave transceiver unit 45 to start emitting the sound waves towards the enclosed space when the trigger unit 41 receives external triggers. The display unit 42 electrically connects to the micro controller unit 43 and is used for displaying the remained water volume checked by the micro controller unit 43 after the micro controller unit 43 completes checking in the lookup table 441.

The measure module 4 further comprises a wireless transceiver unit 46 which electrically connects to the micro controller unit 43. The wireless transceiver unit 46 wirelessly connects to an external device (such as a computer, a smart phone, a tablet etc. which is not shown in the diagram) via a wireless communication means (such as Bluetooth, radio frequency, Near Field Communication etc.) in order to transfer the remained water volume to the external device and displayed or recorded by the external device. Thus, the external device calculates information such as user's water intake quantity, insufficient water volume, etc. according to the remained water volume so as to provide health management data to users.

In the embodiment, the display unit 42 and the wireless transceiver unit 46 are designed to inform users of the remained water volume in the bottle-body 3. The bottle 1 may include either one of the display unit 42 or the wireless transceiver unit 46 to lower the production cost of the bottle 1.

The measure module 4 further comprises a battery unit 47 which electrically connects to the micro controller unit 43 and is used for providing power required to operate the measure module 4.

The measure module 4 further comprises a temperature sense unit 48 which electrically connects to the micro controller unit 43. The measure module 4 senses the temperature within the bottle-body 3 with the temperature sense unit 48. Thus, the micro controller unit 43 obtains the corresponding remained water volume via checking with both the air-resonance frequency and the temperature in the lookup table 441. It should be note that the lookup table 441 records the corresponding relationships of a plurality of frequencies, a plurality of temperatures and a plurality of remained water volumes in an embodiment which the measure module 4 has the temperature sense unit 48 (detailed in the following).

Figure 3:
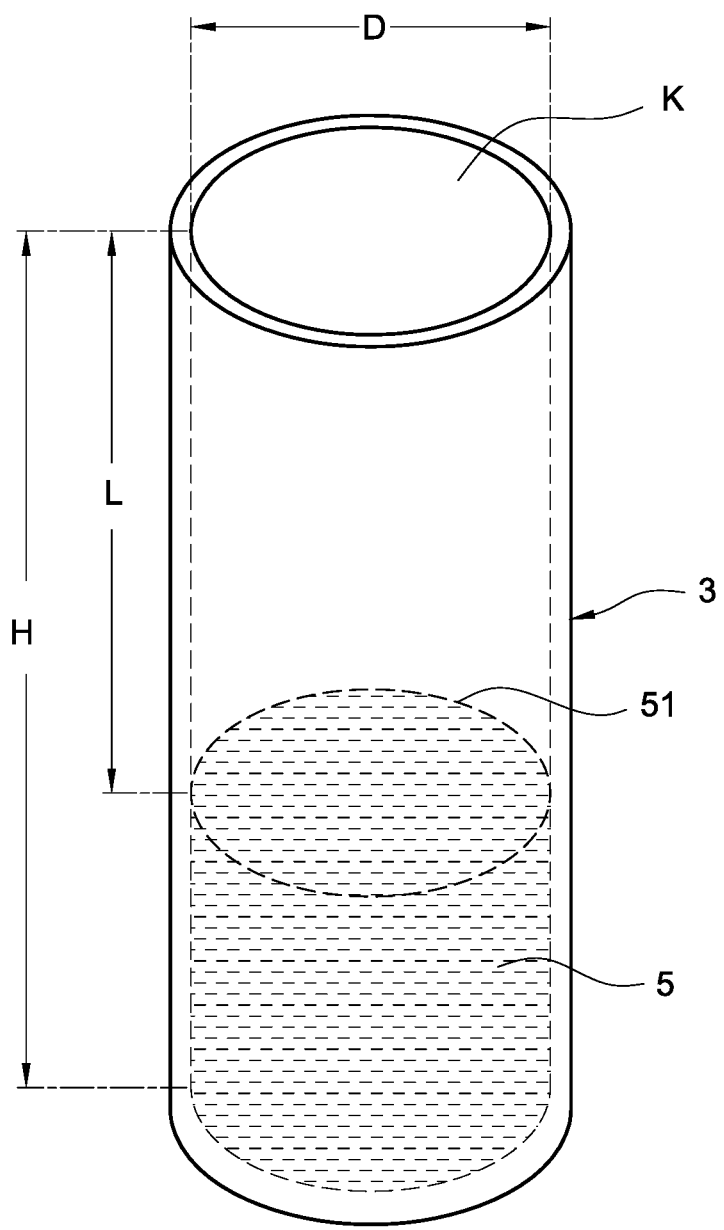
FIG. 3 is a calculating schematic diagram of a remained water volume according to the first embodiment of the present invention.
Figure 4:
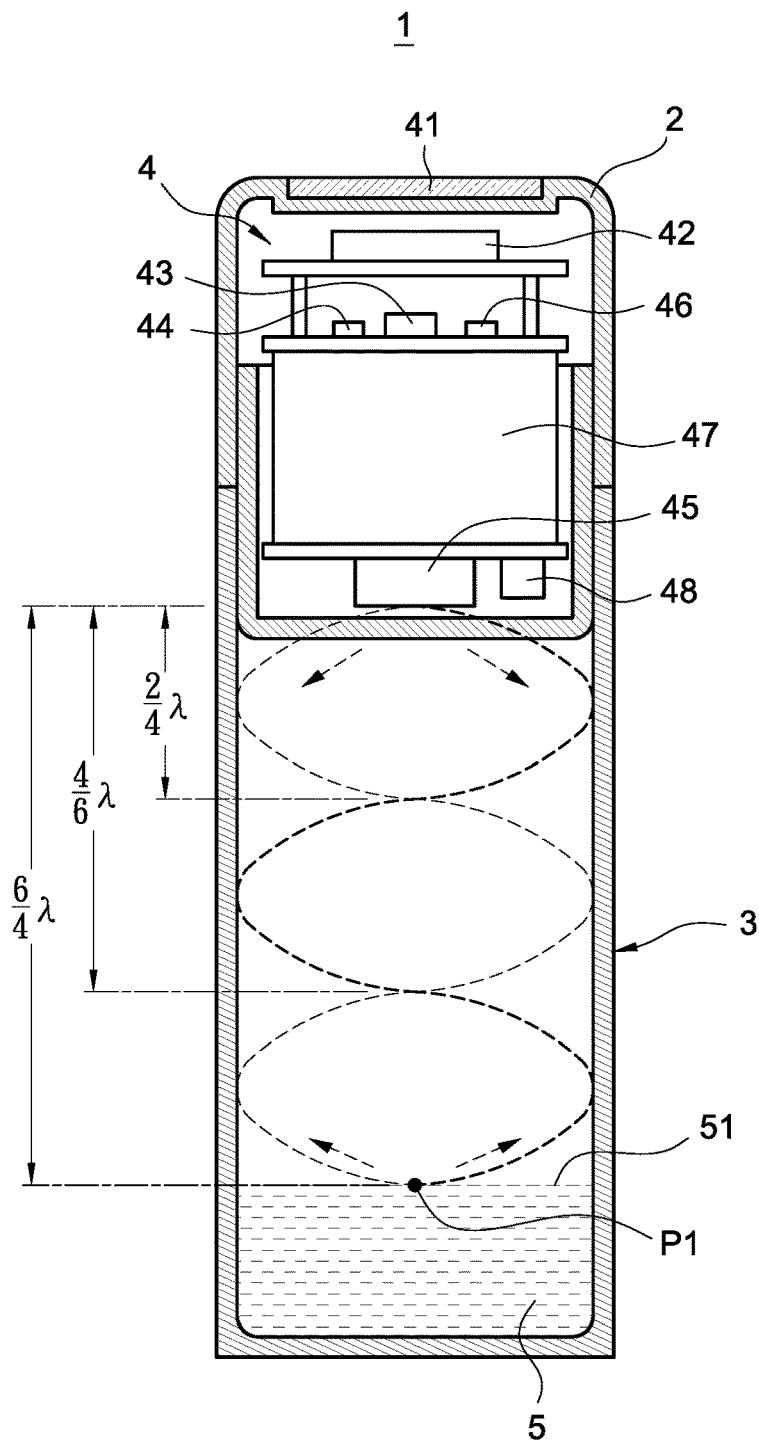
FIG. 4 is a schematic diagram of an air-resonance frequency according to the first embodiment of the present invention.

FIG. 3 is a calculating schematic diagram of a remained water volume according to the first embodiment of the present invention and FIG. 4 is a schematic diagram of an air-resonance frequency according to the first embodiment of the present invention. As mentioned above, the bottle-body 3 is a cylinder bottle-body. The volume of the bottle-body 3 equals to the cross-sectional area K of the bottle-body 3 times the bottle-body height H, and the cross-sectional area K equals to 3.14 times the square of the bottle-body radius (D/2). In the embodiment, the micro controller unit 43 is used for calculating an air column volume within the bottle-body 3, and obtaining the volume of the water 5 remained in the bottle-body 3 via deducting the air column volume from the volume of the bottle-body 3. The cross-sectional area K, the bottle-body height H of the bottle-body 3 and the cross-sectional area K of the air column are known (the cross-sectional area of the air column equals to the cross-sectional area K of the bottle-body 3). In other words, the air column height L is the only variable required to calculate the volume of the water 5.

As shown in FIG. 4, the sound wave transceiver unit 45 emits sound waves with sweeping frequencies towards the bottle-body 3, which means in turn emits sound waves with different frequencies (by increments or decrements) towards the bottle-body 3. In the embodiment, the sound wave transceiver unit 45 is controlled by the micro controller unit 43 to emit sound waves of a low frequency and then increase the frequency of the sound waves by increment to a high frequency, but scope is not limited thereto.

When the sound wave hit a water surface 51 of the water 5 in the bottle-body 3 or hit the bottle bottom of the bottle-body 3 (i.e., the bottle-body 3 is empty without water), the sound wave is then reflected. In the embodiment, the bottle-lid 2 covers the opening 30 of the bottle-body 3 to generate an enclosed space and the disposed location of the sound wave transceiver unit 45 corresponds to the center of the bottle-body 3. Accordingly, the starting point of the sound wave emitted by the sound wave transceiver unit 45 is at 0 degree of a waveform which means the phase of the sound wave is 0 degree (as the waveform shown in FIG. 4).

According to the experiment results completed by the inventors, if the frequency of the sound wave is f and the wave length is known as $\lambda$, the sound wave may generate the air-resonance (i.e., the frequency f of the sound wave is the air-resonance frequency) whenever the air column height L equals to $$\frac{2}{4}\lambda$$

or is the multiple of $$\frac{2}{4}\lambda \left(\text{such as } \frac{4}{4}\lambda, \frac{6}{4}\lambda, \ldots, \text{i.e. } \frac{2N+2}{4}\lambda\right),$$

wherein N is a random positive integer. Therefore, when the sound wave transceiver unit 45 emits sound waves with sweeping frequencies which increases by increments and the micro controller unit 43 observes that one of the frequencies of the received reflected sound waves is an air-resonance frequency, the micro controller unit 43 calculates the air column height L with the wave length of the air-resonance frequency.

Substantially, when a sound wave generates the air-resonance, the energy level of the waveform of the sound wave is added which is at the highest energy level. In the embodiment, the micro controller unit 43 determines if the air-resonance is generated according to the energy level of the reflected sound wave and further determines if the frequency of the reflected wave is an air-resonance frequency. More specifically, the micro controller unit 43 transforms the reflected wave into an analogue voltage via a digital analogue transform procedure and further determines the energy level of the reflected wave of the scale of the analogue voltage, but the scope is not limited thereto.

As shown in FIG. 4, if the sound wave generates the air-resonance within the enclosed space, it means the point which the sound wave hit on the water surface 51 is a resonance point P1, and the resonance point P1 is located at $$\frac{2N+2}{4}\lambda$$

of the sound wave.

It is known to people skill in the art that the velocity of sound waves equals to frequency times wave length ($v = f \times \lambda$), which means the wave length equals to velocity divided by frequency $$\left(\lambda = \frac{v}{f}\right).$$

When the temperature is at the room temperature (21° C.), the velocity of the sound wave equals to 344 m/s. Therefore, the micro controller unit 43 may sense and obtain the air-resonance frequency, and uses the air-resonance frequency to calculate the air column height $$L = \frac{2}{4}\lambda \left(\text{i.e., } \frac{2}{4} \times \frac{344 \text{ m/s}}{\text{first air-resonance frequency}}\right),$$

$$\frac{4}{4}\lambda \left(\text{i.e., } \frac{4}{4} \times \frac{344 \text{ m/s}}{\text{second air-resonance frequency}}\right),$$

$$\frac{6}{4}\lambda \left(\text{i.e., } \frac{6}{4} \times \frac{344 \text{ m/s}}{\text{third air-resonance frequency}}\right),$$

etc., but the scope is not limited thereto. As mentioned above, the sound wave transceiver unit 45 emits sound waves from a lower frequency and increases the frequencies of sound waves by increments to a higher frequency. Accordingly, the above mentioned first air-resonance frequency is a fundamental frequency, the second air-resonance frequency is a first sub-frequency, the third air-resonance frequency is a second sub-frequency, and so on. The fundamental frequency is lower than the first sub-frequency, and the first sub-frequency is lower than the second sub-frequency.

Further, after the micro controller unit 43 completes calculation and obtains the air column height L. the micro controller unit 43 calculates the remained water volume in the bottle-body 3 equals to cross-sectional area K×(bottle-body height H−air column height L).

It should be note that, when the temperature sense unit 48 is disposed in the measure module 4, the micro controller unit 43 calculates the real velocity of the sound wave within the bottle-body 3 according to a formula: $v=331.45+0.6t$, and further calculates the air column height $$L = \frac{2}{4}\lambda \left(\text{i.e. } \frac{2}{4} \times \frac{331.45 + 0.6\,t}{\text{first air-resonance frequency}}\right),$$

$$\frac{4}{4}\lambda \left(\text{i.e. } \frac{4}{4} \times \frac{331.45 + 0.6\,t}{\text{second air-resonance frequency}}\right),$$

$$\frac{6}{4}\lambda \left(\text{i.e., } \frac{6}{4} \times \frac{331.45 + 0.6\,t}{\text{third air-resonance frequency}}\right),$$

etc.

As mentioned above, the bottle of the invention calculates the air-resonance frequencies corresponding to different remained water volumes in the bottle-body 3 in advance with the micro controller unit 43 or an external calculator (not shown in the diagrams), and pre-records the calculated air-resonance frequencies in the lookup table 441, so as to lower computing loads of the micro controller unit 43 and reduces the power consumption of the measure module 4. Thus, when a user want to measure the remained water volume in the bottle-body 3, the micro controller unit 43 can easily obtains the remained water volume in the bottle-body 3 via emitting sound waves with sweeping frequencies towards the bottle-body, receiving reflected waves via the sound wave transceiver unit 45 and finding the air-resonance frequency (the first air-resonance frequency, the second air-resonance frequency, the third air-resonance frequency, etc.) according to the energy level of the reflected waves.

Figure 5:
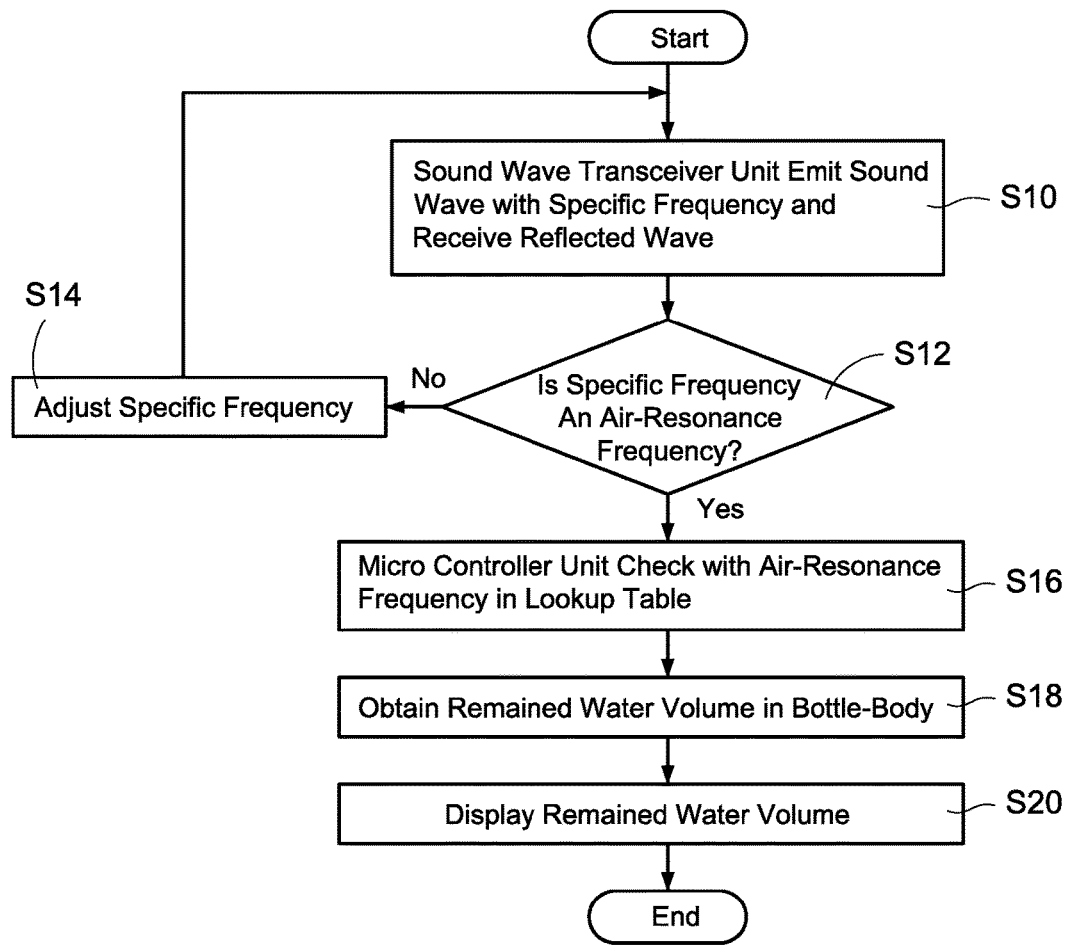
FIG. 5 is a water volume measuring flowchart according to the first embodiment of the present invention.

FIG. 5 is a water volume measuring flowchart according to the first embodiment of the present invention. A water volume measuring method is disclosed in the FIG. 5, which is implemented with the bottle 1 shown in FIG. 1. The detailed steps of the water volume measuring method include the following steps.

First, the micro controller unit 43 controls the sound wave transceiver unit 45 to emit a sound wave with specific frequency and receive the reflected wave (step S10). Next, the micro controller unit 43 determines if the specific frequency is an air-resonance frequency according to the energy level of the reflected wave (step S12). If the specific frequency is not the air-resonance frequency, the micro controller unit 43 controls the sound wave transceiver unit 45 to adjust the specific frequency (Step S14), and return to Step S10 to emit the sound wave with the adjusted specific frequency. In the embodiment, the sound wave transceiver unit 45 adjusts the specific frequency via increasing by increments to sweep the frequency of the emitted sound wave from a low frequency to a high frequency.

If the specific frequency is determined as the air-resonance frequency, the micro controller unit 43 check with the air-resonance frequency in the lookup table 441 in the memory unit 44 (Step S16) so as to obtain the current remained water volume in the bottle-body 3 (Step S18). Lastly, the micro controller unit 43 displays the remained water volume with the display unit 42 or transfers the remained water volume to and display the remained water volume on the external device via the wireless transceiver unit 46 (Step S20).

It should be note that, in the embodiment shown in FIG. 5, the measure module does not comprise the temperature sense unit 48. Accordingly, the plurality of remained water volumes recorded in the look up table 441 is all related to the room temperature and the velocity of 344 m/s.

Figure 6:
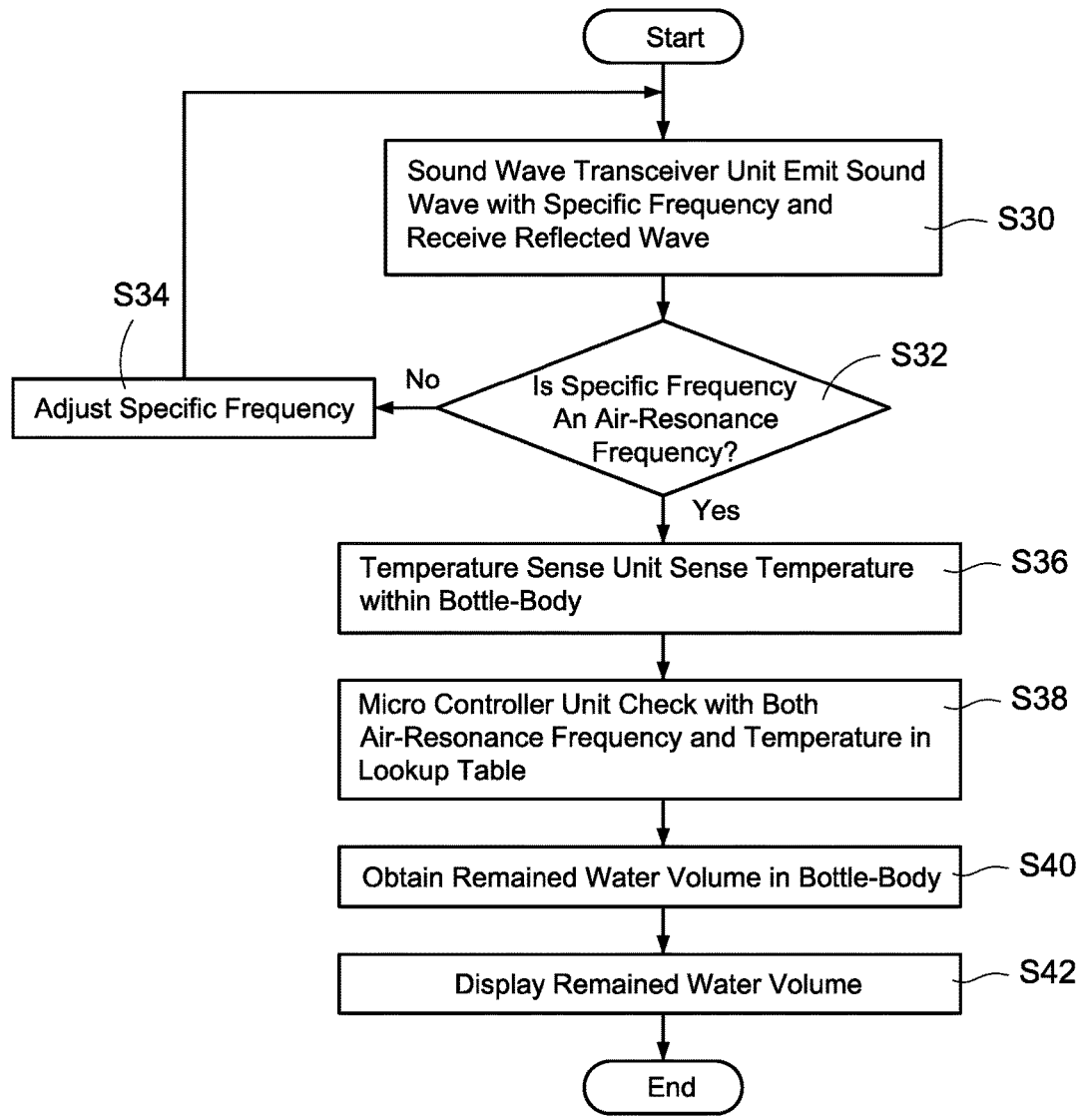
FIG. 6 is a water volume measuring flowchart according to a second embodiment of the present invention.

FIG. 6 is a water volume measuring flowchart according to a second embodiment of the present invention. Another water volume measuring method is disclosed in the FIG. 6, which is implemented with the bottle 1 shown in FIG. 1. The detailed steps of the water volume measuring method include the following steps.

Identical with the first embodiment shown in FIG. 5, the micro controller unit 43 controls the sound wave transceiver unit 45 to emit a sound wave with specific frequency and receive the reflected wave in the second embodiment (step S30). Next, the micro controller unit 43 determines if the specific frequency is an air-resonance frequency according to the energy level of the reflected wave (step S32), and the micro controller unit 43 controls the sound wave transceiver unit 45 to adjust the specific frequency when the specific frequency is not the air-resonance frequency (Step S34), and again performs step S30 to re-emit the sound wave with the adjusted specific frequency.

The difference between the present embodiment and the first embodiment shown in FIG. 5 is that, the measure module 4 further comprises the temperature sense unit 48. In the embodiment, when the micro controller unit 43 determines that the specific frequency of the current sound wave is the air-resonance frequency, the micro controller unit 43 further controls the temperature sense unit 48 to sense the temperature within the bottle-body 3 (Step S36), and checks with both the air-resonance frequency and the temperature in the lookup table 441 in the memory unit 44 (Step S38) to obtain the remained water volume in the bottle-body 3 (Step S40). Lastly, the micro controller unit 43 displays the remained water volume with the display unit 42 or the external device (Step S42).

In an embodiment, the lookup table 441 records corresponding relationships among a plurality of frequencies, a plurality of temperatures and a plurality of remained water volumes at the same time, which is listed in the following table:

| Frequency | Temperature | Remained water volume |
|-----------|-------------|-----------------------|
| F1 | T1 | A1 |
| F1 | T2 | A2 |
| F1 | T3 | A3 |
| F2 | T1 | A4 |
| F2 | T2 | A5 |
| ... | ... | ... |
| Fn | Tn | An |

As shown in the above table, when the micro controller unit 43 obtains the air-resonance frequency and the temperature after measuring, the micro controller unit 43 checks with both the air-resonance frequency and the temperature in the lookup table 441 to obtain the remained water volume. For example, if the determined air-resonance frequency is F1 and the temperature is T1, the remained water volume will be A1 according to the above table; if the determined air-resonance frequency is F1 and the temperature is T2, the remained water volume will be A2 according to the above table; if the determined air-resonance frequency is F2 and the temperature is T1, the remained water volume will be A4 according to the above table, and so on.

In another embodiment, the micro controller unit 43 obtains the air-resonance frequency and the temperature (for example 60° C.) after measuring, and the micro controller unit 43 then calculates the wave length of the sound wave $$\left(\lambda = \frac{331.45 + 0.6\ t}{f}\right)$$

according to the air-resonance frequency and the temperature, next, the micro controller unit 43 calculates another frequency of the wave length $$\left(f = \frac{344}{\lambda}\right)$$

under the room temperature (25° C.) according to the obtained wave length. Lastly, the micro controller unit 43 checks with the another frequency in the lookup table 441 to obtain the corresponding remained water volume. In the embodiment, the lookup table 441 only records the corresponding relationships between different frequencies and different remained water volumes under the room temperature.

The embodiments mentioned above are calculation methods implemented in the experiments completed by the inventors of the present invention, but the scope is not limited thereto.

Figure 7:
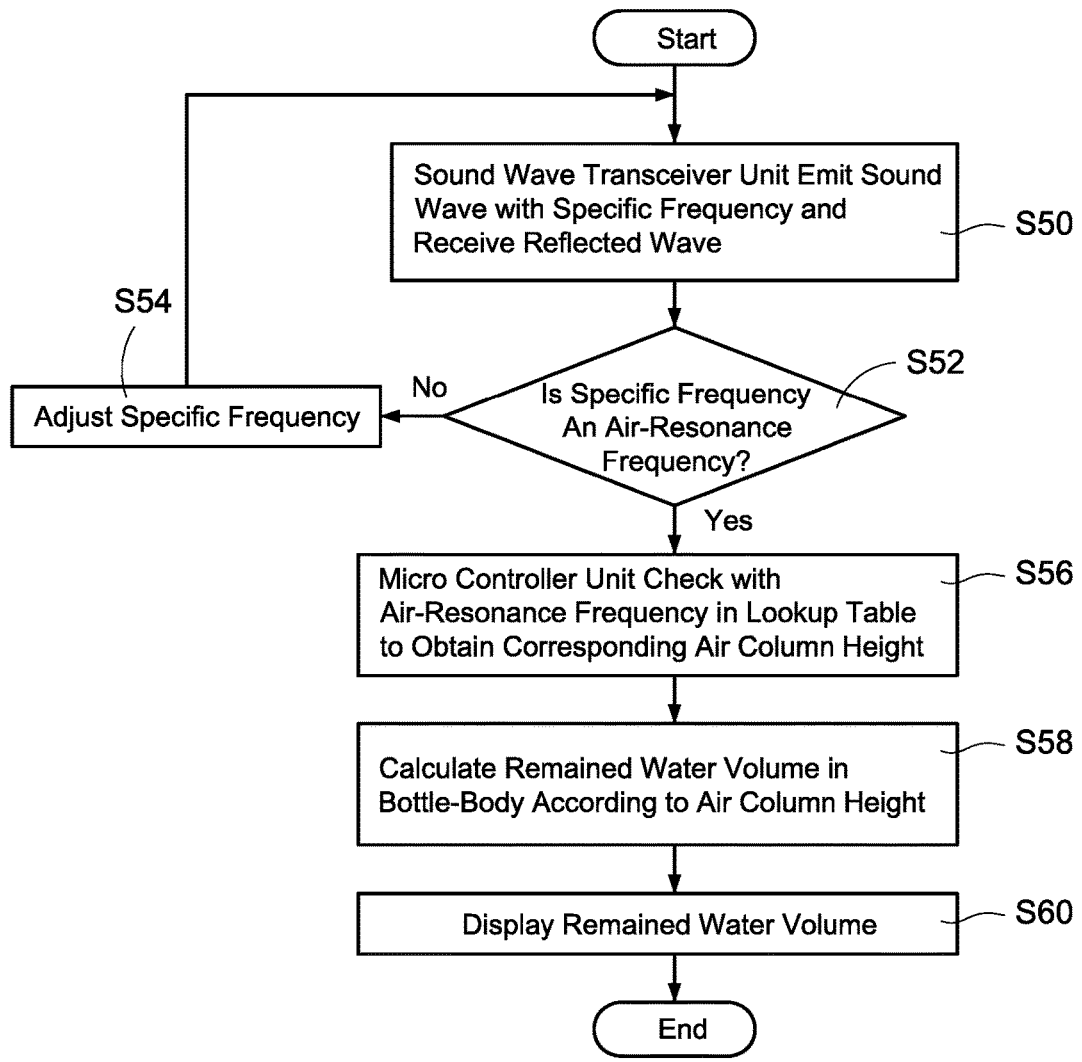
FIG. 7 is a water volume measuring flowchart according to a third embodiment of the present invention.

FIG. 7 is a water volume measuring flowchart according to a third embodiment of the present invention. Another water volume measuring method is disclosed in the FIG. 7, which is implemented with the bottle 1 shown in FIG. 1. The detailed steps of the water volume measuring method include the following steps.

Identical with the first embodiment and the second embodiment as shown in FIG. 5 and FIG. 6, the micro controller unit 43 controls the sound wave transceiver unit 45 to emit a sound wave with specific frequency and receive the reflected wave in this embodiment (step S50). Next, the micro controller unit 43 determines if the specific frequency is an air-resonance frequency according to the energy level of the reflected wave (step S52), and the micro controller unit 43 controls the sound wave transceiver unit 45 to adjust the specific frequency when the specific frequency is not the air-resonance frequency (Step S54), and again performs step S50 to re-emit the sound wave with the adjusted specific frequency.

The difference between the present embodiment and the first embodiment/the second embodiment is that the lookup table 441 in the present embodiment is used for recording the corresponding relationships of a plurality of frequencies and a plurality of heights of an air column within the bottle-body 3. Specifically, the content of an exemplary lookup table 441 is listed below:

| Frequency | Air column height |
|---|---|
| F1 | L1 |
| F2 | L2 |
| F3 | L3 |
| ... | ... |
| Fn | Ln |

The micro controller unit 43 confirms the specific frequency is the air-resonance frequency in Step S52 and checks with the air-resonance frequency in the lookup table 441 to obtain corresponding air column height L (Step S56). Next the micro controller unit 43 calculates the remained water volume in the bottle-body 3 according to the air column height L (Step S58) and displays the remained water volume with the display unit 42 or the external device (Step S60).

It should be note that, as shown in FIG. 3, the micro controller unit 43 calculates the air column volume in the bottle 3 according to the cross-sectional area K and the height L of the bottle-body 3, calculate the volume in the bottle-body 3 according to the cross-sectional area K of the bottle-body 3 and the bottle height H, then calculates the volume of the water 5 in the bottle-body 3 (the remained water volume) by deducting the air column volume from the volume of the bottle-body 3.

With the present invention, a user of the bottle 1 is allowed to trigger the water volume measuring function with operating the trigger unit 41 without opening the bottle-lid 2 and view the remained water volume in the bottle-body 3 via the display unit 42 or the external device wirelessly connected to the bottle 1, which is convenient and useful in the water intake management of the user.

As the skilled person will appreciate, various changes and modifications can be made to the described embodiment. It is intended to include all such variations, modifications and equivalents which fall within the scope of the present invention, as defined in the accompanying claims.

What is claimed is:

1. A bottle having water volume measuring function comprising:
   a bottle-body with an opening;
   a bottle-lid disposed at the opening of the bottle-body and forming an enclosed space within the bottle-body; and
   a measure module, disposed in the bottle-lid toward the enclosed space, and comprising:
   a memory unit for storing a lookup table with corresponding relationships of a plurality of frequencies and remained water volumes in the bottle-body;
   a sweeping frequency type sound wave transceiver unit for emitting sound waves with sweeping frequencies towards the bottle-body and receiving reflected waves, wherein the sweeping frequency type sound wave transceiver unit is disposed at a bottom of the measure module facing outward and is disposed at a center of the bottle-lid without contacting the bottle-body; and
   a micro controller unit electrically connected to the memory unit and the sweeping frequency type sound wave transceiver unit for determining if any frequency of the sound waves is an air-resonance frequency according to an energy level of each of the reflected waves, and obtaining the corresponding remained water volume by checking with the air-resonance frequency in the lookup table, wherein the micro controller unit determines that one of the sound waves has the air-resonance frequency if the sound wave generates an air-resonance effect in the enclosed space.

2. The bottle having water volume measuring function of claim 1, wherein the bottle-body is a cylinder bottle-body.

3. The bottle having water volume measuring function of claim 1, wherein the bottle further comprises a display unit electrically connected to the micro controller unit for displaying the remained water volume in the bottle-body.

4. The bottle having water volume measuring function of claim 1, wherein the bottle further comprises a wireless transceiver unit electrically connected to the micro controller unit for wireless transferring the remained water volume in the bottle-body to an external device.

5. The bottle having water volume measuring function of claim 1, wherein the bottle further comprises a temperature sense unit electrically connected to the micro controller unit for sensing a temperature within the bottle and the lookup table records corresponding relationships among the plurality of frequencies, a plurality of temperatures and the plurality of remained water volumes.

6. The bottle having water volume measuring function of claim 1, wherein the bottle further comprises a trigger unit electrically connected to the micro controller unit, and the micro controller unit controls the sweeping frequency type sound wave transceiver unit to start emitting the sound waves when the trigger unit receives external triggers.

7. A bottle having water volume measuring function comprising:
   a bottle-body with an opening;
   a bottle-lid disposed at the opening of the bottle-body and forming an enclosed space within the bottle-body; and
   a measure module, disposed in the bottle-lid toward the enclosed space, and comprising:
   a memory unit for storing a lookup table with corresponding relationships of a plurality of frequencies and a plurality of air column heights of the bottle-body;
   a sweeping frequency type sound wave transceiver unit for emitting sound waves with sweeping frequencies towards the bottle-body and receiving reflected waves, wherein the sweeping frequency type sound wave transceiver unit is disposed at a bottom of the measure module facing outward and is disposed at a center of the bottle-lid without contacting the bottle-body; and a micro controller unit electrically connected to the memory unit and the sweeping frequency type sound wave transceiver unit for determining if any frequency of the sound waves is an air-resonance frequency according to an energy level of each of the reflected waves, and obtaining the corresponding air column height by checking with the air-resonance frequency in the lookup table, and calculating a remained water volume in the bottle-body according to the obtained air column height, wherein the micro controller unit determines that one of the sound waves has the air-resonance frequency if the sound wave generates an air-resonance effect in the enclosed space.

8. The bottle having water volume measuring function of claim 7, wherein the micro controller unit calculates an air column volume of the bottle according to a cross-sectional area of the bottle and the obtained air column height of the bottle-body and calculates the remained water volume by deducting the air column volume from a volume of the bottle-body.

9. The bottle having water volume measuring function of claim 8, wherein the bottle-body is a cylinder bottle-body and the bottle further comprises a display unit electrically connected to the micro controller unit for displaying the remained water volume in the bottle-body.

* * * * *